United States Patent [19]
Gowda

[11] Patent Number: 5,141,293
[45] Date of Patent: Aug. 25, 1992

[54] HYDRAULIC ISOLATION VALVE FOR RAILWAY VEHICLE

[75] Inventor: Padmanab L. Gowda, Greer, S.C.

[73] Assignee: Westinghouse Air Brake Company, Wilmerding, Pa.

[21] Appl. No.: 579,750

[22] Filed: Sep. 10, 1990

[51] Int. Cl.⁵ .............................................. B60T 11/32
[52] U.S. Cl. ...................................... 303/84.2; 303/9.63
[58] Field of Search .................... 303/9.62, 9.63, 84.1, 303/84.2

[56] References Cited

U.S. PATENT DOCUMENTS

| | | | |
|---|---|---|---|
| 2,239,348 | 4/1941 | Wirtanen et al. | 303/84.2 |
| 2,568,311 | 9/1951 | Wise et al. | 303/84.2 |
| 2,931,178 | 4/1960 | Straus | 303/84.2 |
| 2,960,102 | 11/1960 | Margida | 303/84.2 |
| 3,107,681 | 10/1963 | May | 303/84.2 |
| 3,473,851 | 10/1969 | Neves | 303/84.2 |
| 3,753,601 | 8/1973 | Hensley | 303/84.2 |
| 4,159,755 | 7/1979 | Kang et al. | 303/84.2 |
| 4,281,880 | 8/1981 | Gaiser | 303/9.63 |
| 4,422,694 | 12/1983 | Schopper et al. | 303/84.2 |

Primary Examiner—Matthew C. Graham
Attorney, Agent, or Firm—G. J. Falce

[57] ABSTRACT

An isolation valve device for a hydraulic brake system of a railway vehicle including passageways via which hydraulic pressure communication is established between a pressure controller and the brake units of each truck of a railway vehicle, and a bore to receive a pair of piston valves adapted to interrupt hydraulic pressure communication in a respective one of the passageways leading to the different truck brake units, when a pressure differential occurs therebetween, due to a ruptured brake line at one of the trucks, for example, causing a hydraulic fluid leak thereat.

8 Claims, 1 Drawing Sheet

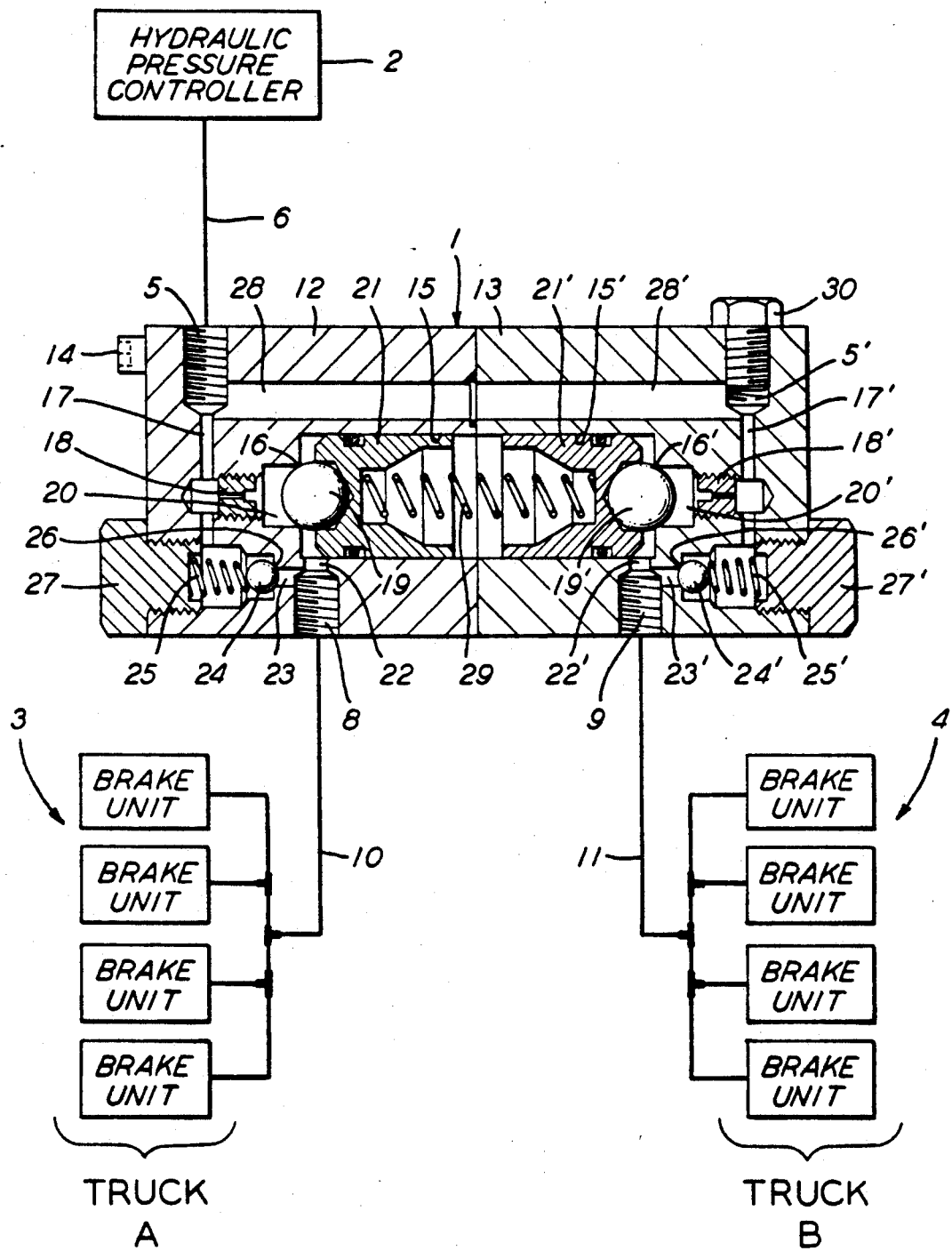

HYDRAULIC ISOLATION VALVE FOR RAILWAY VEHICLE

BACKGROUND OF THE INVENTION

This invention relates to isolation valves in hydraulic brake systems of railway vehicles and particularly to transit-type railway vehicles which employ spring-applied, hydraulic pressure released brake units.

Hydraulic brake systems employing spring-applied, pressure-released brake units are inherently safe from a braking standpoint, due to the fact that loss of hydraulic pressure for any reason will result in the brakes being automatically applied under spring force. Any loss of hydraulic fluid, however, presents a safety hazard which is unrelated to braking, due to its environmental impact. Hydraulic fluid which is spewed onto the track area is not only a pollutant, but also presents a fire hazard, especially in the vicinity of third rail electrical systems.

So-called isolation valves are typically employed in these hydraulic brake systems to prevent such loss of hydraulic fluid, in the event of a ruptured brake line. Generally, an isolation valve is located between the hydraulic pressure controller on each railway car and the brake units of the respective railway car truck. The isolation valve must sense a reduction in pressure in the brake circuit leading to the brake units of either truck and cut off the supply of hydraulic fluid to the truck having a leak in its brake circuit, while continuing to establish hydraulic pressure communication with the other truck brake units. In cutting off the supply of hydraulic fluid to the truck brake units having a leak in its brake circuit, without also cutting off the hydraulic fluid supply to the other truck brake units, only a single truck of the railway car experiences loss of brake control.

One known type of isolation valve relies on the differential pressure effective on opposite sides of a spool valve to shift the spool valve from a central position in which it is normally maintained by two springs, when a hydraulic leak occurs in either truck brake circuit. As long as the downstream pressure remains substantially equal in the separate truck braking circuits, the spring centers the spool valve, to establish hydraulic pressure communication between the controlled input pressure and each one of the respective truck brake circuits. In the event of leakage in either one of the truck brake circuits downstream of the isolation valve, the resultant low pressure therein creates the differential pressure to shift the spool valve in the appropriate direction from its normal central position and thereby cut off the supply of hydraulic fluid to the leaking brake circuit, while continuing to conduct hydraulic fluid to the other brake circuit.

If one of the centering springs breaks or binds for any reason, however, the spool will be forced to one side and will cut off the supply of hydraulic brake fluid to that particular brake circuit, even in the absence of any leakage whatsoever in that circuit. This will prevent the brakes from being released following a brake application, when an isolation valve of the type described is used in a hydraulic brake system having spring-applied, hydraulic pressure released brake units.

SUMMARY OF THE INVENTION

One object of the present invention is to provide an isolation valve that, in the absence of a hydraulic leak, does not interfere with the supply and release of hydraulic fluid in the brake circuits controlled thereby even in the event of a malfunction of the isolation valve due to a broken bias spring.

Briefly, the foregoing objective is achieved by providing an isolation valve device having first and second passageways between a hydraulic pressure controller and the brake units of the respective trucks of a railway vehicle, there being a bore in the isolation valve opening into the first and second passageways with first and second piston valves operatively disposed therein, each piston valve being adapted to interrupt hydraulic pressure communication in a respective one of the passageways leading to the different truck brake units, in response to a pressure differential therebetween, when a hydraulic leak exists at one of the trucks, due to a ruptured brake line, for example.

BRIEF DESCRIPTION OF THE DRAWING

This object and other objects and advantages of the invention will become apparent from the following more detailed explanation of the invention, when considered in light of the accompanying single FIGURE schematic drawing of a hydraulic brake system for a railway vehicle in which the isolation valve device of the present invention is shown in section.

DESCRIPTION AND OPERATION

In accordance with the present invention, there is shown an isolation valve device 1 interposed in a braking circuit between a hydraulic pressure controller 2 and the brake units 3, 4 of the respective trucks A, B of a railway vehicle. An inlet port 5 of isolation valve device 1 is connected by a brake line 6 to hydraulic pressure controller 2, which establishes and maintains hydraulic fluid in the braking circuit at the desired pressure. A pair of outlet ports 8 and 9 of isolation valve 1 is connected by brake lines 10 and 11 to the respective brake units 3 and 4 at the different trucks A and B. These brake units may be a well-known spring-applied, hydraulic pressure released type, such as typically employed in transit-type railway vehicles.

Isolation valve 1 consists of body segments 12, 13 which are held together preferably by four elongated screws 14, only one of which can be seen in the drawing. A bore 15 in body segment 12 terminates in an annular valve seat 16 to which inlet port 5 is connected by a drill passage 17 having a fluid flow restrictor such as a choke fitting 18. A ball valve 19 is contained within a cavity 20 formed between valve seat 16 and one end of a piston 21 that is operatively disposed in bore 15. Cavity 20 is connected by a passage 22 to outlet port 8, which is in turn connected to passage 17 via a bypass passage 23 having a ball valve 24. A light bias spring 25 urges ball valve 24 toward engagement with its seat 26, so as to permit a back-flow of fluid in passage 23 only in a direction from outlet port 8 to inlet port 5 in bypass of ball valve 19. A screw-threaded plug 27 closes an opening to passage 23 via which ball check valve 24 and spring 25 can be installed and removed. Another passage 28 is connected from inlet port 5 to the face of body segment 12 that adjoins body segment 13.

Body segment 13 is similar to body segment 12, the corresponding parts being identified by like reference numerals that are distinguished by a prime (') mark. A single spring 29, however, is common to the respective body segments, being disposed in bore 15 between the respective pistons 21, 21'. The spring force acts through pistons 21, 21' to urge ball valves 19, 19' toward engagement with their respective valve seats 16, 16'. A plug 30 closes inlet port 5' of body segment 13 when hydraulic pressure controller 1 is connected to inlet port 5 of body segment 12. Alternatively, hydraulic pressure controller 1 can be connected to inlet port 5', in which case inlet port 5 would be plugged.

In operation, isolation valve 1 normally conducts the flow of hydraulic pressure between hydraulic pressure controller 2 and brake units 3 and 4 of the respective trucks A and B. When controller 2 is initially activated, hydraulic fluid under pressure enters port 5 from brake line 6 and flows concurrently to cavities 20, 20' via the respective passages 17, 17' and flow restrictors 18, 18'. During this initial charging of the hydraulic circuit, spring 29 acting through the respective pistons 21, 21', maintains ball valves 19, 19' engaged with their seats 16, 16'. This delays opening of the ball valves to allow pressure equalization to occur between cavities 20, 20'. When the hydraulic pressure acting on ball valves 19, 19' builds up sufficiently to overcome the force of spring 29, pistons 21, 21' are shifted to a central position in bore 15. In this position, ball valves 19, 19' are accordingly forced off of their seats 16, 16' and pistons 21, 21' are forced into contact with each other by the hydraulic pressure acting on the respective pistons. Hydraulic fluid is then conducted past the unseated ball valves to the respective truck brake units 3, 4 via passages 22, 22', the outlet ports 8, 9 and brake lines 10, 11. The hydraulic fluid supplied to the respective brake units acts against the brake unit actuating springs to maintain the brake units in a release condition.

In providing spring 29 to delay opening of pistons 21, 21' until pressure equalization occurs between cavities 20, 20', as mentioned, one piston is prevented from being shifted into engagement with the other piston before the ball valve of the other piston has become unseated, thus assuring charging of hydraulic brake circuits of both trucks A and B. This only requires that spring 29 be relatively light, and therefore no delay occurs in achieving a brake release, due to the bias of spring 29.

When a brake application is desired, the hydraulic pressure is reduced in proportion to the desired braking force. Hydraulic fluid at brake units 3, 4 of the respective trucks A and B is then returned to the hydraulic controller via brake lines 10, 11, ports 8, 9, ball valves 24, 24', passages 17, 17', passage 28, port 5 and brake line 6, in bypass of flow restrictors 18, 18'. In bypassing flow restrictors 18, 18', an unrestricted return flow of hydraulic fluid occurs, so that pressure at brake units 3, 4 is quickly reduced. Accordingly, the brake unit actuating springs are effective to apply braking force without delay.

In the event a leak occurs in the hydraulic circuit between outlet port 8 and brake units 3 of truck A, such as at brake line 10, for example, the hydraulic pressure effective on the face of piston 21 drops, due to the reduced supply through flow restrictor 18. A force differential is thus created across pistons 21, 21', due to the fact that the hydraulic pressure acting on the face of piston 21' is isolated from the pressure drop in the hydraulic circuit of truck A. Piston 21' is thus forced in the direction of piston 21 to, in turn, force ball valve 19 to engage seat 16 and thereby interrupt the hydraulic flow path between controller 2 and brake units 3. Closure of ball valve 19 allows the hydraulic pressure in cavity 20 to build up via choke 18, and eventually equalize with the pressure in cavity 20'. However, since ball valve 16 is seated, a relatively small area (the area of ball valve 16) is subject to the hydraulic pressure effective in cavity 20, as compared to the relatively large area of piston 21' that is subject to the hydraulic fluid in cavity 20'. Accordingly, ball valve 19 continues to be held against its seat 16 to prevent hydraulic fluid from being supplied to ruptured brake line 10, so that no further leakage of hydraulic fluid can occur.

In order to reset isolation valve 1 following repair of the hydraulic leak, hydraulic pressure controller 2 must be deactivated, thereby causing the pressure at port 5 to be reduced to zero. Spring 29 is then effective to cause both pistons 21, 21' to seat their respective ball vales 19, 19'. The hydraulic circuit may then be recharged, as previously explained, with isolation valve 1 being restored to an active condition in which control of the hydraulic pressure in the brake circuits of both trucks A and B is established.

In the event spring 29 should break, the isolation valve 1 will continue to establish communication between controller 2 and each brake circuit of trucks A and B. However, following operation of the isolation valve to interrupt either one of the truck hydraulic brake circuits when a leak occurs thereat, the broken spring will be unable to exert a bias force to delay shifting of the respective pistons 20, 21 during system recharge. Consequently, one or the other piston may shift prior to the other and thus prevent shifting of the other piston due to the resultant differential force on the respective pistons. In such case, only the brake circuit of the truck associated with the shifted piston will be recharged and the other piston will continue to maintain its ball valve seated to prevent charging of that brake circuit. Such a condition can be monitored by appropriate pressure switches or the like, as an indication of a broken spring and will ensure that the broken spring is replaced.

I claim:

1. In a hydraulic brake system of a railway vehicle, an isolation valve device for interrupting hydraulic pressure communication between a hydraulic pressure controller and the brake units of one truck of the railway vehicle when a hydraulic leak exists thereat, without interrupting hydraulic pressure communication between the pressure controller and the brake units of the other truck of the railway vehicle, said isolation valve device comprising:

(a) a first passageway via which hydraulic pressure communication is established between said pressure controller and the brake units of said one truck of said railway vehicle;

(b) a second passageway via which hydraulic pressure communication is established between said pressure controller and the brake units of said other truck of said railway vehicle;

(c) a bore opening into said first and second passageway;

(d) a first piston operatively disposed in said bore adjacent said first passageway;

(e) first valve means carried by said first piston for controlling the flow of hydraulic fluid in said first passageway;

(f) a second piston separate from said first piston and operatively disposed in said bore adjacent said second passageway, said first and second pistons being movable in said bore independently of each other;

(g) second valve means carried by said second piston for controlling flow of hydraulic fluid in said second passageway, either one of said first and second pistons being engageable with the other of said first and second pistons in response to a pressure differential therebetween to cause a respective one of said first and second valve means to interrupt flow of hydraulic fluid in whichever one of said first and second passageways the hydraulic pressure is lower than in the other of said first and second passageways.

2. An isolation valve device, as recited in claim 1, further comprising a first and a second fluid flow restrictor, each in a respective one of said first and second passageways.

3. An isolation valve device, as recited in claim 2, wherein said first and second fluid flow restrictors are between said hydraulic pressure controller and said opening of said bore into said first and second passages, respectively.

4. An isolation valve device, as recited in claim 3, further comprising first and second bypass check valve means for conducting the flow of hydraulic fluid pressure from the brake units of said one and said other trucks, respectively, to said hydraulic pressure controller in parallel with said first and second fluid flow restrictors.

5. An isolation valve device, as recited in claim 4, further comprising first and second annular valve seats in said first and second passages, respectively, at a location between respective ones of said first and second fluid flow restrictors and the brake units of said one and said other trucks.

6. An isolation valve device, as recited in claim 5, further comprising a spring in said bore acting on said first and second piston valves in the direction of said first and second valve seats, respectively.

7. An isolation valve device, as recited in claim 6, wherein said first and second piston valves each comprises:

(a) a piston member; and
(b) a ball valve between said piston member and a respective one of said first and second valve seats, said ball valve being separate from said piston member.

8. An isolation valve device, as recited in claim 7, wherein the area of said ball valve within said first and second annular valve seats is in less than the area of said first and second piston members within said bore.

* * * * *